United States Patent
Sugawara et al.

(10) Patent No.: US 6,219,483 B1
(45) Date of Patent: Apr. 17, 2001

(54) OPTICAL DEVICE AND IMAGING APPARATUS USING THE SAME

(75) Inventors: Takeo Sugawara; Makoto Suzuki, both of Shizuoka-ken (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 0 days.

(21) Appl. No.: 09/463,594
(22) PCT Filed: Jul. 30, 1998
(86) PCT No.: PCT/JP98/03395
  § 371 Date: Jan. 28, 2000
  § 102(e) Date: Jan. 28, 2000
(87) PCT Pub. No.: WO99/06863
  PCT Pub. Date: Feb. 11, 1999

(30) Foreign Application Priority Data

Jul. 30, 1997 (JP) .................................................... 9-204560

(51) Int. Cl.⁷ ...................................................... G02B 6/04
(52) U.S. Cl. ............................. 385/120; 385/115; 385/116
(58) Field of Search .................................... 385/115, 116, 385/120, 123, 124, 901

(56) References Cited

U.S. PATENT DOCUMENTS

| | | | |
|---|---|---|---|
| 3,043,910 | 7/1962 | Hicks, Jr. ............................ | 178/7.85 |
| 5,940,565 | * 8/1999 | Sugawara ............................. | 385/115 |
| 6,038,360 | * 8/1999 | Sugawara ............................. | 385/120 |

FOREIGN PATENT DOCUMENTS

| | | |
|---|---|---|
| 60-194429 | 10/1985 | (JP) . |
| 8-286048 | 11/1996 | (JP) . |

* cited by examiner

Primary Examiner—Phan T. H. Palmer
(74) Attorney, Agent, or Firm—Morgan, Lewis & Bockius

(57) ABSTRACT

An optical device 10 comprises an input optical member 11, in which a plurality of optical fibers 14 are arranged parallel to each other and integrally formed, having an entrance surface 11a and an exit surface 11b which intersect an optical axis at respective angles of 90° and 20°; and an output optical member 12, in which a plurality of optical fibers are arranged parallel to each other and integrally formed, having an entrance surface 12a intersecting an optical axis at an angle of 55° and an exit surface 12b parallel to the entrance surface 12a. Here, the exit surface 11b of the input optical member 11 and the entrance surface 12a of the output optical member 12 are in contact with each other, whereas the angle formed between the optical axis of the input optical member 11 and the optical axis of the output optical member 12 is an angle of 35° which is the difference between 55° and 20° mentioned above.

5 Claims, 8 Drawing Sheets

OPTICAL DEVICE AND IMAGING APPARATUS USING THE SAME

TECHNICAL FIELD

The present invention relates to an optical device and an imaging apparatus using the same.

BACKGROUND ART

Known as an optical member for transmitting an optical image is one in which a plurality of optical fibers are arranged parallel to each other and integrally formed. Also, an optical device in which one of end faces of the above-mentioned optical member is cut perpendicular to the optical axis, whereas the other end face is cut obliquely with respect to the optical axis, is disclosed, for example, in Japanese Patent Application Laid-Open No. SHO 60-194429. Such an optical device can transmit an optical image incident on the above-mentioned one end face while enlarging (or reducing) it to a given magnification in a specific direction.

DISCLOSURE OF THE INVENTION

However, the above-mentioned optical device has been problematic in that, if the angle formed between the above-mentioned other end face and the optical axis is made smaller in order to enhance the magnification, the output image emitted from the other end face becomes unclear. Therefore, it is an object of the present invention to provide an optical device which can yield a vivid output image.

For achieving the above-mentioned object, the optical device of the present invention comprises a first optical member, composed of a plurality of optical fibers arranged parallel to each other and integrally formed, having a first end face and a second end face which intersect an optical axis at respective angles of $\alpha_1, \beta_1$; and a second optical member, composed of a plurality of optical fibers arranged parallel to each other and integrally formed, having a third end face intersecting an optical axis at an angle of $\alpha_2$ and a fourth end face parallel to the third end face; wherein the second end face and the third end face are in contact with each other; wherein the above-mentioned $\beta_1$ is smaller than the above-mentioned $\alpha_2$; and wherein an angle $\theta_1$ formed between the optical axis of the first optical member and the optical axis of the second optical member is an angle of difference between $\beta_1$ and $\alpha_2$.

Since the second optical member having the configuration mentioned above is disposed in contact with the second end face of the first optical member, the direction of emission of the optical image emitted from the fourth end face of the second optical member approximates the normal direction of the fourth end face. As a consequence, even when the angle formed between the second end face and the optical axis is quite small, a vivid optical image can be obtained from the fourth end face.

BRIEF DESCRIPTION OF THE DRAWINGS

BEST MODE FOR CARRYING OUT THE INVENTION (1) Optical Device According to Embodiment of Present Invention An optical device in accordance with an embodiment of the present invention will be explained with reference to drawings. First, the configuration of the optical device in accordance with this embodiment will be explained. As shown in FIG. 1, the optical device 10 comprises an input optical member 11 and an output optical member 12.

Figure 1:
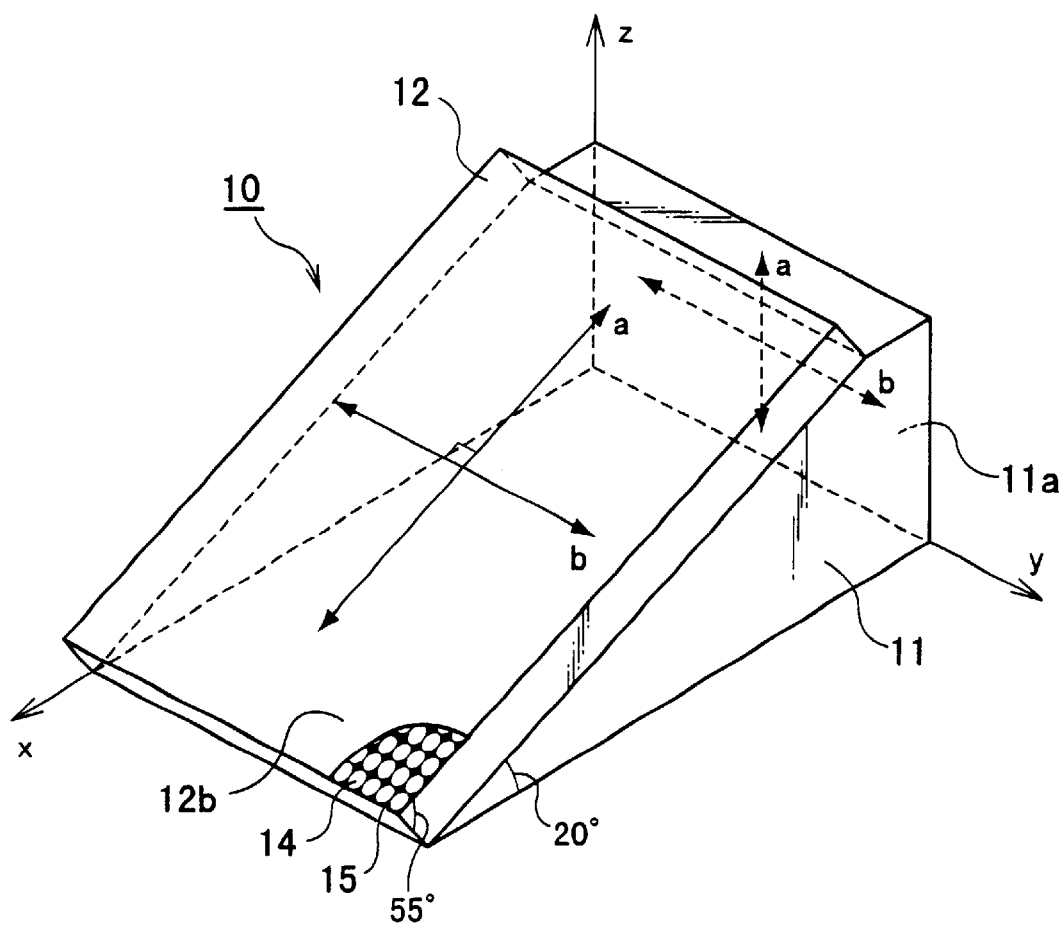
FIG. 1 is a perspective view of an optical device.

Each of the input optical member 11 and the output optical member 12 comprises a plurality of optical fibers which are arranged parallel to each other and integrally formed. Each optical fiber 14 has a diameter on the order of 3 to 10 $\mu$m, whereas the refractive index of the core 14a, the refractive index of the cladding 14b, and the numerical aperture in the optical fiber 14 constituting each optical member are as shown in Table 1.

TABLE 1

|  | Core Refractive Index | Cladding Refractive Index | Numerical Aperture |
| --- | --- | --- | --- |
| Input Optical Member | 1.82 | 1.495 | 1.0 |
| Output Optical Member | 1.82 | 1.495 | 1.0 |

Also, gaps among the individual optical fibers 14 constituting the input optical member 11 and output optical member 12 are filled with a light-absorbing material 15.

The input optical member 11 has an entrance surface 11a which is cut with respect to the optical axis (the optical axis of optical fibers constituting the optical member) at an angle of 90° and an exit surface 11b which is obliquely cut with respect to the optical axis at an angle of 20°, whereas both of the entrance surface 11a and the exit surface 11b are optically ground.

The output optical member 12 has an entrance surface 12a which is cut with respect to the optical axis at an angle of 55° and an exit surface 12b which is parallel to the entrance surface 12a, whereas both of the entrance surface 12a and the exit surface 12b are optically ground. Here, the angle formed between the optical axis of the input optical member 11 and its exit surface 11b is smaller than the angle formed between the optical axis of the output optical member 12 and its entrance surface 12a.

The exit surface 11b of the input optical member 11 and the entrance surface 12a of the output optical member 12 are in contact with each other. As a consequence, an optical image incident on the entrance surface 11a of the input optical member 11 is transmitted to the exit surface 12b of the output optical member 12.

Here, both of the entrance surface 11a and exit surface 11b of the input optical member 11 and both of the entrance surface 12a and exit surface 12b of the output optical member 12 are perpendicular to the xz plane of FIG. 1, whereas the optical axes of the optical fibers 14 constituting the individual optical members are parallel to the xz plane of FIG. 1.

Figure 2:
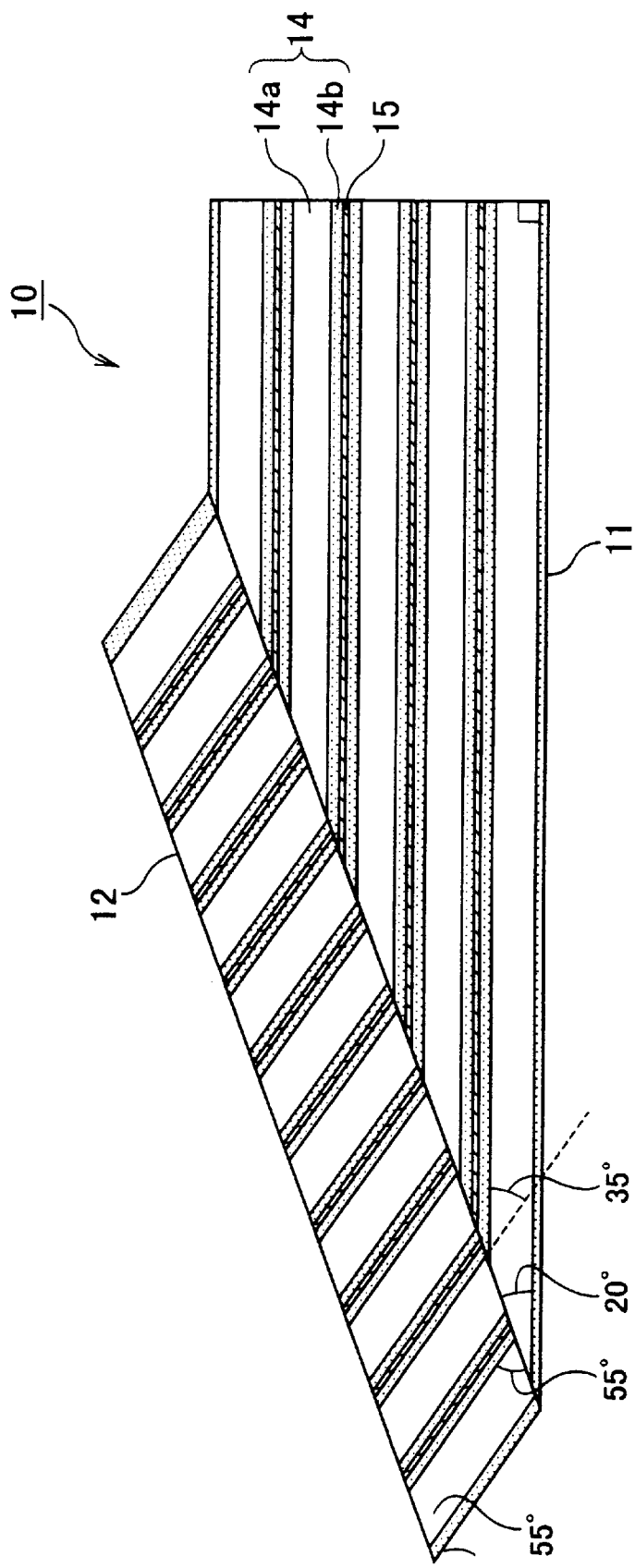
FIG. 2 is a schematic sectional view of the optical device.

FIG. 2 is a schematic sectional view of the optical device taken along a plane parallel to the xz plane. Here, FIG. 2 is a schematic sectional view showing the relationship between the respective optical axes of the optical members, whereas each optical member is a bundle of several thousands of optical fibers in practice. Here, the angle formed between the optical axis of the input optical member 11 and the optical axis of the output optical member 12 is an angle of 35° which is the difference between the angle of 55° formed between the optical axis of the output optical member 12 and its entrance surface 12a and the angle of 20° formed between the optical axis of the input optical member 11 and its exit surface 11b.

Figure 3:
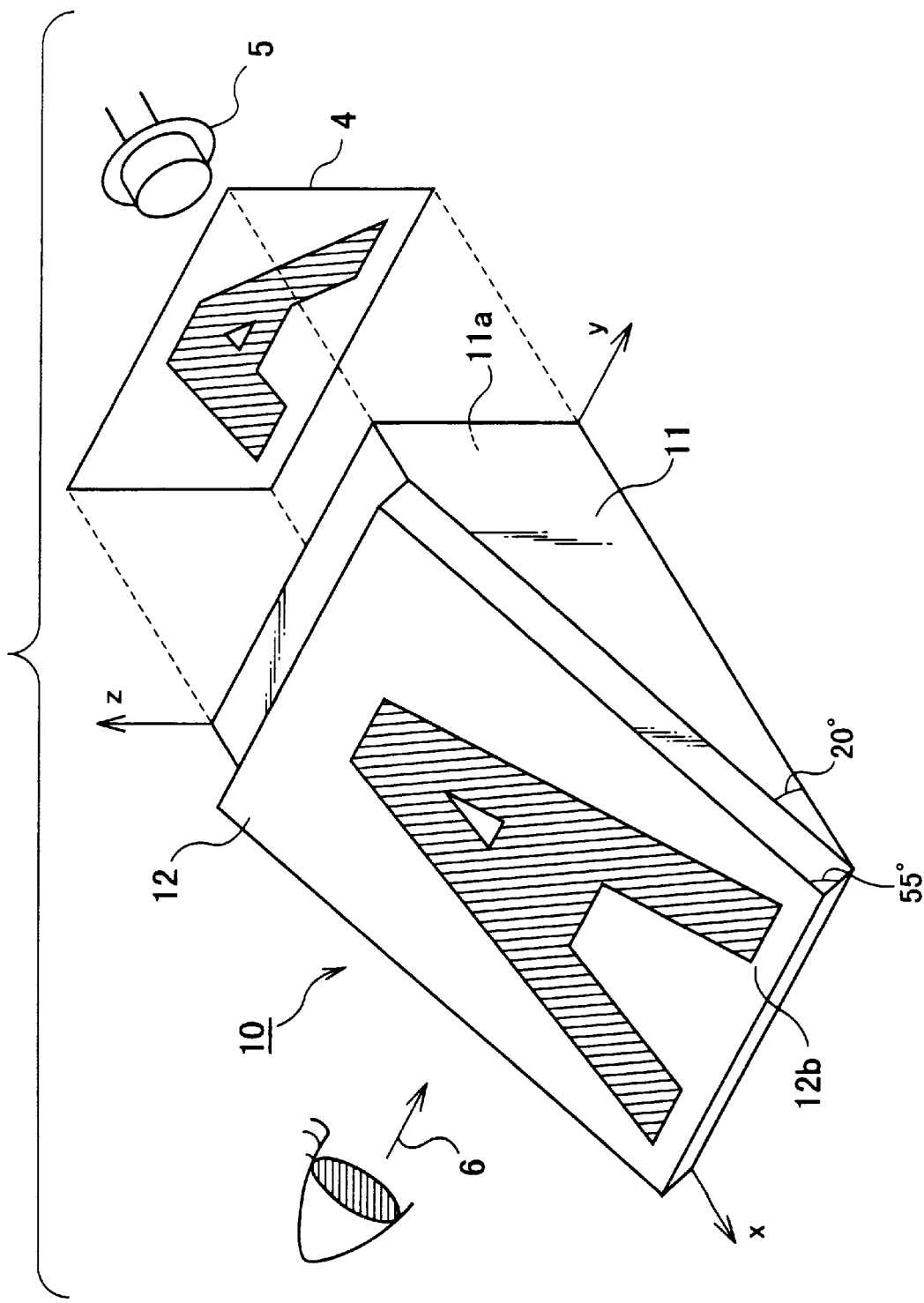
FIG. 3 is a view for explaining the use of the optical device.

For example, the optical device 10 is arranged as shown in FIG. 3 when it is used for enlarging and viewing a predetermined image pattern. Namely, a light-shielding plate 4 or the like having a predetermined pattern is irradiated with light from an LED 5 or the like, so that an optical image forming the predetermined input pattern is incident on the entrance surface 11a of the input optical member 11. The optical image is transmitted through the input optical member 11 and the output optical member 12, and then is emitted from the exit surface 12b of the output optical member 12 as being enlarged. Therefore, as shown in FIG. 3, an output image enlarging the input pattern can be observed when the exit surface 12b of the output optical member 12 is viewed in a direction 6 substantially perpendicular to the exit surface 12b of the output optical member 12.

Figure 4:
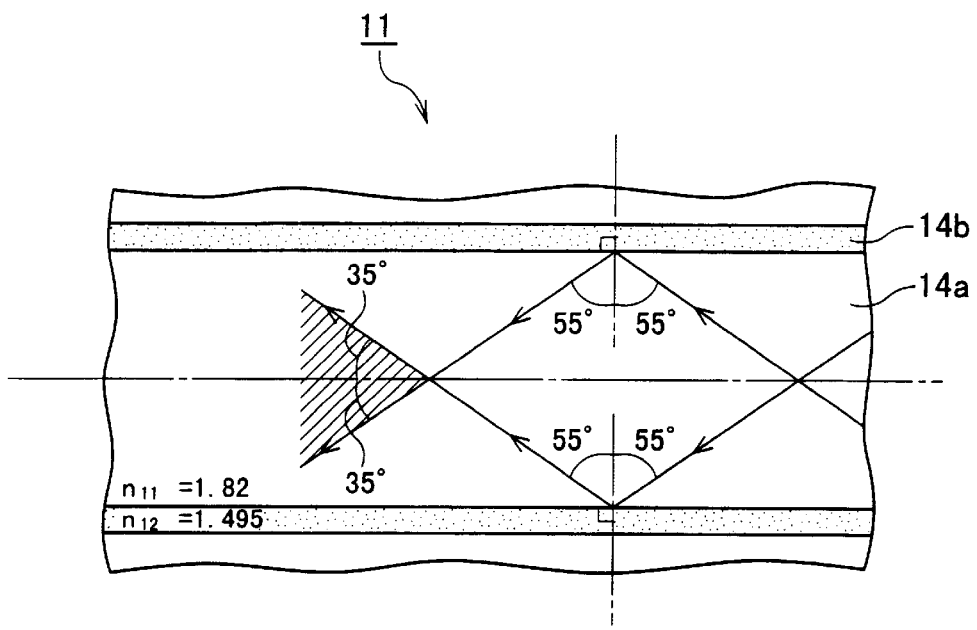
FIG. 4 is an explanatory view showing light propagation within the optical device.

Operations of the optical device in accordance with this embodiment will now be explained. First, a case where the light incident on the entrance surface 11a of the input optical member 11 from the air propagates while being refracted and reflected by the core/cladding interface of the optical fibers 14 constituting the input optical member 11 as shown in FIG. 4 will be considered. Here, letting $n_{11}$ and $n_{12}$ be the respective refractive indices of the core 14a and cladding 14b of the optical fibers 14 constituting the input optical member 11, and $\epsilon_1$ be the angle of incidence of light incident on the cladding 14b from its core 14a, only the light satisfying a total reflection condition at the core/cladding interface $$\sin \epsilon_1 > n_{12}/n_{11} \qquad (1)$$

propagates through the optical fibers 14 constituting the input optical member 11.

In the optical device 10 in accordance with this embodiment, since $n_{11}=1.82$, and $n_{12}=1.495$, light in which $\epsilon_1$ becomes 55° or greater propagates through the optical fibers 14 constituting the input optical member 11. Namely, as indicated by the hatched area of FIG. 4, only the light forming an angle of 35° or less with the optical axis would propagate through the optical fibers 14 constituting the input optical member 11.

Also, since the entrance surface 11a of the input optical member 11 is perpendicular to the xz plane of FIG. 1 and the optical axis of the input optical member 11, whereas the exit surface 11b of the input optical member 11 is perpendicular to the xz plane and forms an angle of 20° with the optical axis of the input optical member 11, the input optical member 11 acts to enlarge the optical image incident on the entrance surface 11a to about 2.92 times (1/sin20°) in the a-axis direction of FIG. 1 and output thus enlarged optical image.

A case where the light emitted from the exit surface 11b of the input optical member 11 propagates while being refracted and reflected by the core/cladding interface of the optical fibers 14 constituting the output optical member 12 will now be considered.

First, for comparison, a case where the output optical member 12 is not provided will be considered. In the case without the output optical member 12, the light having reached the exit surface 11b of the input optical member 11 advances as follows. Namely, letting $n_{11}$ be the refractive index of the core 14a of the optical fiber 14 constituting the input optical member 11, and $n_0$ be the refractive index of the air, the critical angle $\zeta_{max}$ in the case where the light is emitted from the core 14a of the optical fiber 14 into the air satisfies $$n_0 \sin 90° = n_{11} \sin \zeta_{max}. \qquad (2)$$

Figure 5:
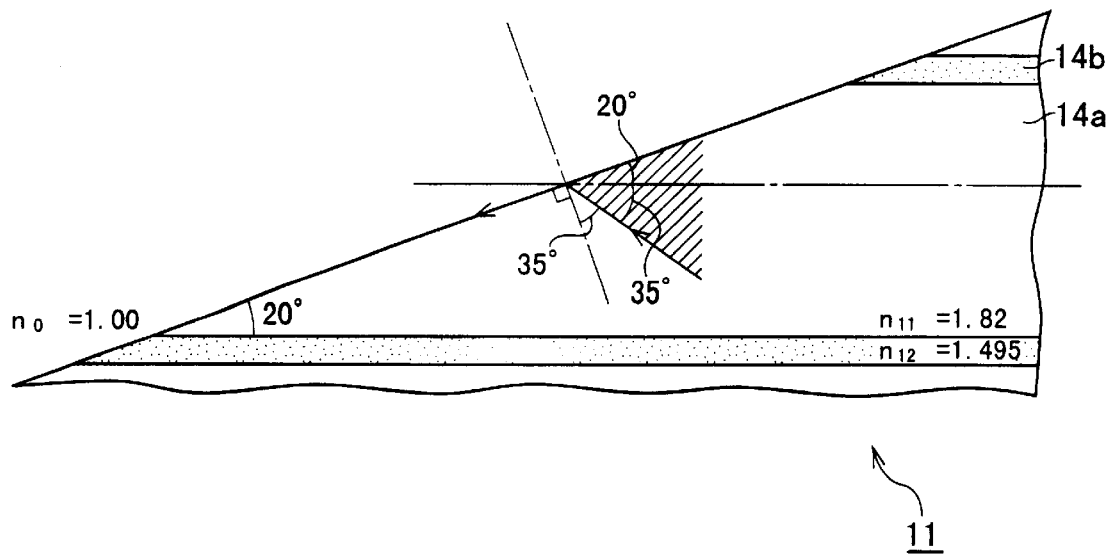
FIG. 5 is an explanatory view showing light propagation within the optical device.

Here, if $n_{11}=1.82$, and $n_0=1.00$, then the critical angle $\zeta_{max}$ will be about 33.3°. In the input optical member 11 employed in this embodiment, on the other hand, only the light forming an angle of 35° or less with the optical axis propagates through the optical fibers 14 as explained above. Therefore, the light having propagated through the optical fibers 14, such as that indicated by the hatched area of FIG. 5, is totally reflected by the exit surface 11b of the input optical member 11 and would not be emitted to the outside. As a result, no output image but a quite dark image would be formed at the exit surface 11b of the input optical member 11.

In the case where the output optical member 12 is provided as in the optical device 10 in accordance with this embodiment, by contrast, the light incident on the entrance surface 12a of the output optical member 12 from the exit surface 11b of the input optical member 11 behaves in various manners according to its angle of incidence. This will be explained in detail in the following.

Figure 6:
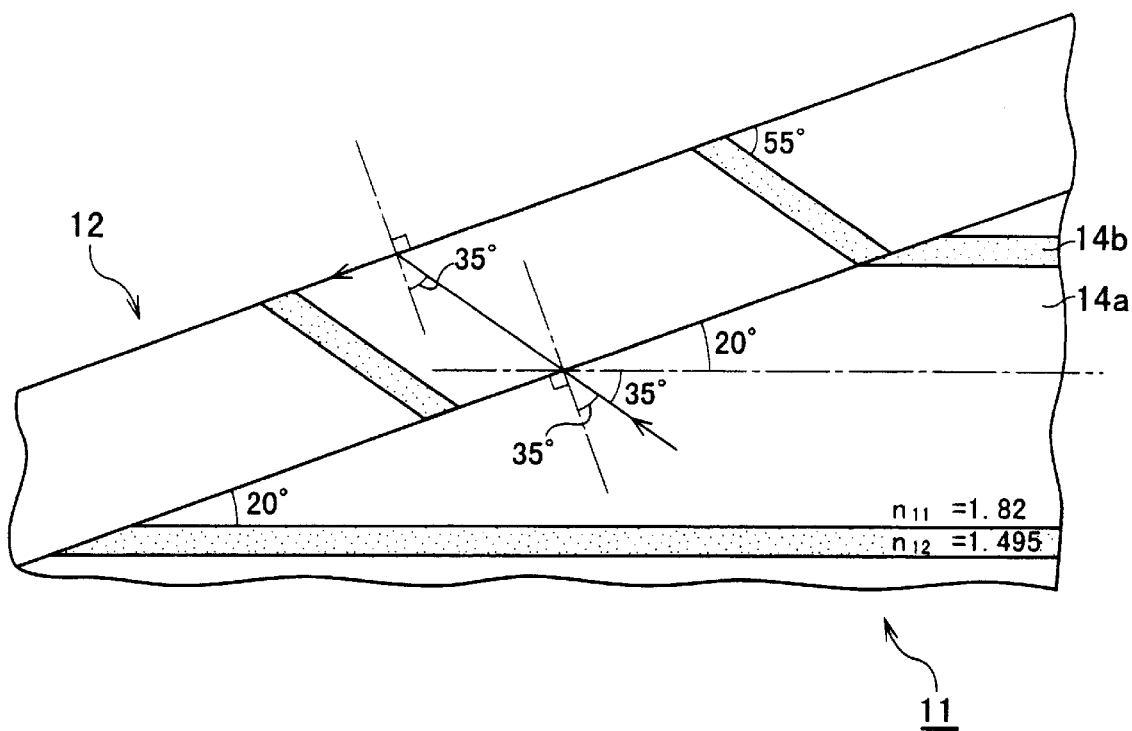
FIG. 6 is an explanatory view showing light propagation within the optical device.

While only the light forming an angle of 35° or less with the optical axis propagates through the optical fibers 14 in the input optical member 11 as explained above, the light forming an angle of 35° with the optical axis of the input optical member 11 and having entered the output optical member 12 at an incident angle of 35° advances straight, as shown in FIG. 6, without being refracted by the interface between the input optical member 11 and the output optical member 12 since the refractive index $n_{21}$ of the core 14a of the optical fiber 14 constituting the output optical member 12 is identical to the refractive index $n_{11}$ of the core 14a of the optical fiber 14 constituting the input optical member 11. Further, since the critical angle at which light is emitted from the exit surface 12b of the output optical member 12 into the air is 33.3° as with the above-mentioned $\zeta_{max}$, the light having advanced through the core 14a of the optical fiber 14 constituting the output optical member 12 is totally reflected by the exit surface 12b of the output optical member 12 and would not be emitted to the outside.

Figure 7:
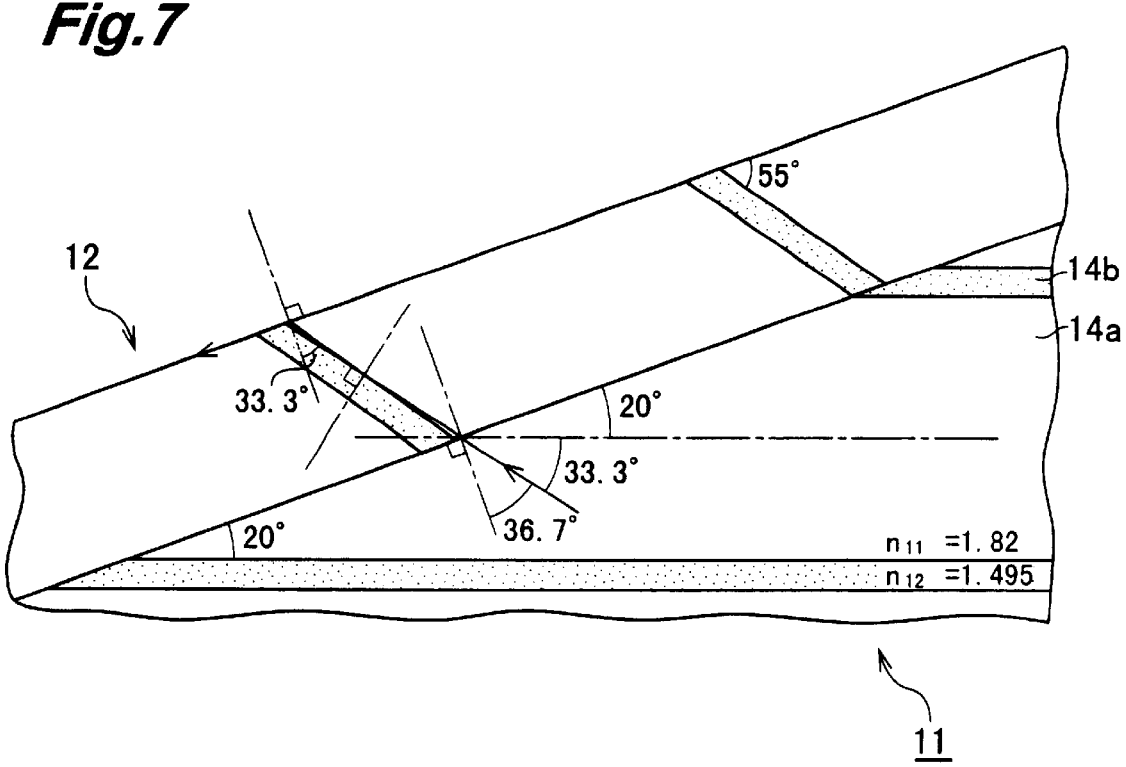
FIG. 7 is an explanatory view showing light propagation within the optical device.
Figure 8:
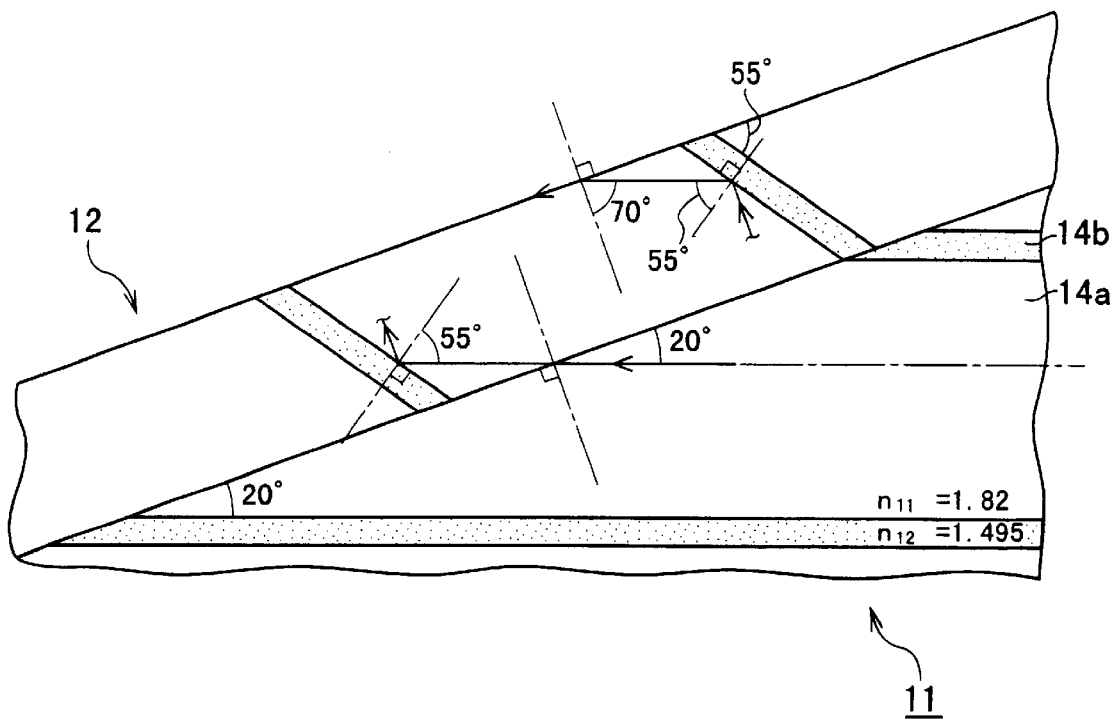
FIG. 8 is an explanatory view showing light propagation within the optical device.

Similarly, the light forming an angle of 33.3° with the optical axis of the input optical member 11 and having entered the output optical member 12 at an incident angle of 36.7° as shown in FIG. 7, the light incident on the output optical member 12 in parallel with the optical axis of the input optical member 11 and reflected by the core/cladding interface of the optical fiber 14 constituting the output optical member 12 by an even number of times as shown in FIG. 8, and the like are totally reflected by the exit surface 12b of the output optical member 12 and would not be emitted to the outside.

Figure 9:
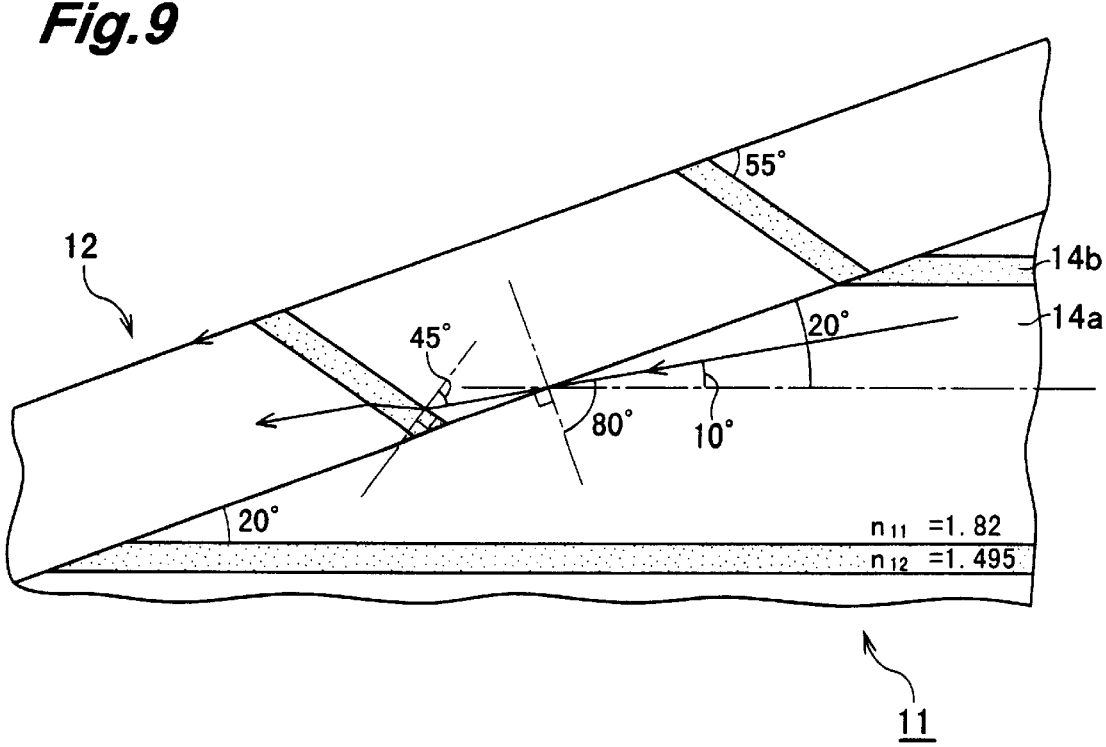
FIG. 9 is an explanatory view showing light propagation within the optical device.

Also, the light forming an angle of 10° with the optical axis of the input optical member 11 and having entered the output optical member 12 at an incident angle of 80° as shown in FIG. 9 and the like fail to satisfy the total reflection condition at the core/cladding interface of the optical fiber 14 constituting the output optical member 12, and would attenuate and disappear.

Figure 10:
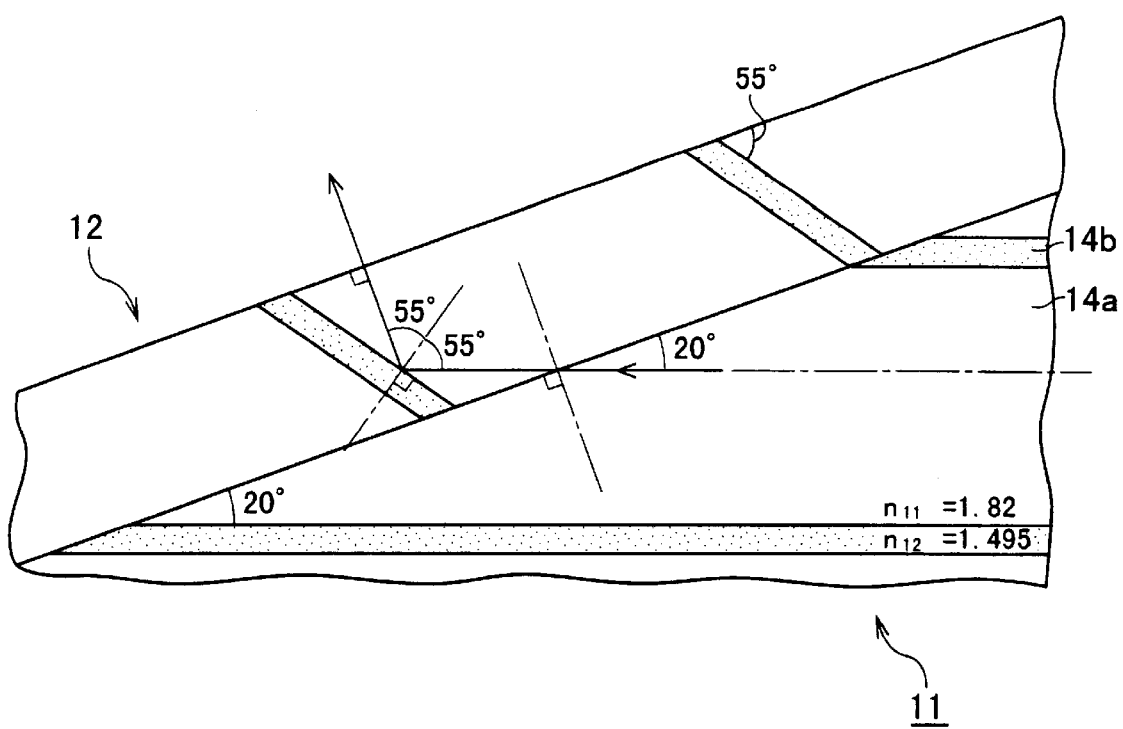
FIG. 10 is an explanatory view showing light propagation within the optical device.

By contrast, the light incident on the output optical member 12 in parallel with the optical axis of the input optical member 11 and reflected by the core/cladding interface of the optical fiber 14 constituting the output optical member 12 by an odd number of times as shown in FIG. 10 and the like are emitted in the normal direction of the exit surface 12b of the output optical member 12. More specifically, of the light forming an angle of 35° or less with the optical axis and having propagated through the optical fiber 14 constituting the input optical member 11, the part incident on the output optical member 12 at an incident angle of 36.7° to 70° and reflected by the core/cladding interface of the optical fiber 14 constituting the output optical member 12 by an odd number of times would be emitted from the exit surface 12b of the output optical member 12 at an emission angle within the range of 0° to 90°.

Effects of the optical device in accordance with this embodiment will now be explained. Since the output optical member 12 having the configuration mentioned above is disposed in contact with the exit surface 11b of the input optical member 11, the direction of emission of the optical image emitted from the exit surface 12b of the output optical member 12 can approximate the normal direction of the exit surface 12b of the output optical member 12. As a result, even when the angle formed between the exit surface 11b of the input optical member 11 and its optical axis is made quite small in order to enhance the magnification of the incident image, a vivid enlarged image can be obtained from the exit surface 12b of the output optical member 12.

In the optical device 10 in accordance with this embodiment, various modifications can be considered concerning the angles formed between the optical axis of the input optical member 11 and its entrance surface 11a and exit surface 11b, and the angles formed between the optical axis of the output optical member 12 and its entrance surface 12a and exit surface 12b.

A given magnification can be obtained when the angles formed between the optical axis of the input optical member 11 and its entrance surface 11a and exit surface 11b are adjusted as appropriate.

Table 2 shows the range of incident angle ζ onto the entrance surface 12a in which light is emitted from the exit surface 12b of the output optical member 12 to the outside, the extent Δζ of the range of incident angle ζ onto the entrance surface 12a in which light is emitted from the exit surface 12b of the output optical member 12 to the outside, the range of emission angle ξ of light emitted from the exit surface 12b of the output optical member 12 to the outside, and the extent Δξ of the range of light emitted from the exit surface 12b of the output optical member 12 to the outside in the case where the angle α formed between the optical axis of the output optical member 12 and its entrance surface 12a (=the angle formed between the optical axis and the exit surface 12b) is varied.

TABLE 2

| α | ζ | Δζ | ξ | Δξ |
|---|---|----|---|----|
| 40° | 66.7° ~ 85.0° | 18.3° | 28.1° ~ 90.0° | 61.9° |
| 55° | 36.7° ~ 70.0° | 33.3° | 0.0° ~ 90.0° | 90.0° |
| 60° | 35.0° ~ 65.0° | 30.0° | 0.0° ~ 50.3° | 50.3° |

From Table 2, it is seen that, when the angle α formed between the optical axis of the output optical member 12 and its entrance surface 12a is smaller or greater than 55°, then Δζ decreases, whereby the transmission efficiency deteriorates. When the angle α formed between the optical axis of the output optical member 12 and its entrance surface 12a is enhanced, however, a greater distribution of the emission direction of light emitted from the exit surface 12b of the output optical member 12 would lie in the normal direction of the exit surface 12b of the output optical member 12. Also, when the angle α formed between the optical axis of the output optical member 12 and its entrance surface 12a is 90°, then all the light incident on the output optical member 12 is totally reflected by the exit surface 12b of the output optical member 12 and would not be emitted to the outside.

When an optical image is inputted from the exit surface 12b of the output optical member 12, the optical device in accordance with this embodiment can also be used as an optical device for reducing and outputting the incident image.

Figure 11:
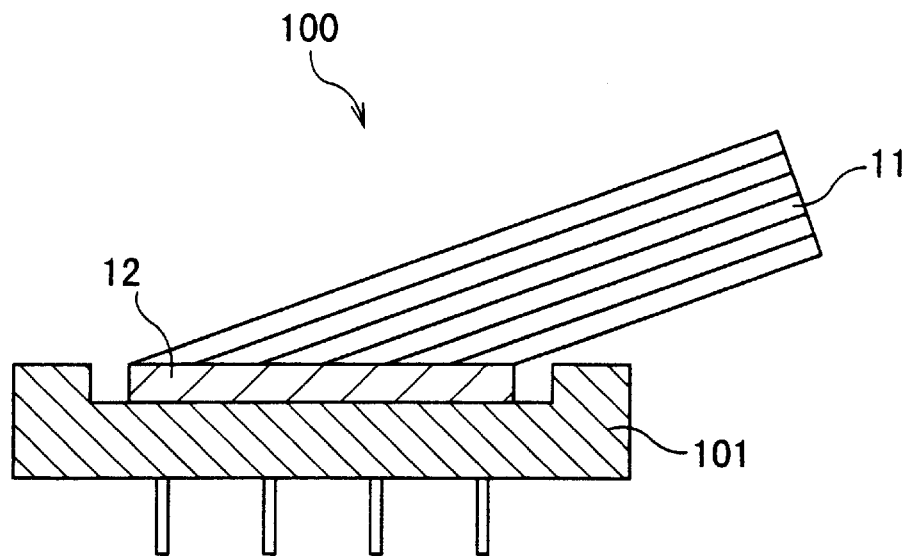
FIG. 11 is a configurational view of an imaging apparatus.

(2) Imaging Apparatus Using Optical Device According to Embodiment of Present Invention An imaging apparatus using the optical device in accordance with the above-mentioned embodiment will now be explained with reference to a drawing. First, the configuration of the imaging apparatus using the optical device in accordance with the above-mentioned embodiment will be explained. As shown in FIG. 11, the imaging apparatus 100 comprises the above-mentioned optical device 10 (i.e., optical device 10 comprising the input optical member 11 and the output optical member 12), and a CCD 101 disposed in contact with the exit surface 12b of the above-mentioned output optical member 12. Here, more specifically, the exit surface 12b of the output optical member 12 is in contact with the light-receiving surface of the CCD 101.

Further, all the surfaces (hereinafter referred to as side faces) of the input optical member 11 excluding the entrance surface 11a and exit surface 11b and the side faces of the output optical member 12 are provided with a light-shielding material.

The side faces of each optical member can be provided with the light-shielding material by a method in which the entrance surface and exit surface of each optical member are masked and then a light-shielding agent (e.g., black paint) is sprayed on the side faces, a method in which the light-shielding agent is applied to the side faces with a brush, a method in which the optical member is immersed into a vessel filled with the light-shielding agent, or the like.

Operations and effects of the imaging unit using the optical device in accordance with the above-mentioned embodiment will now be explained. Since the imaging apparatus 100 comprises the above-mentioned optical device 10, the optical image incident on the entrance surface 11a of the input optical member 11 can efficiently be enlarged and transmitted to the exit surface 12b of the output optical member 12, so as to be outputted from the exit surface 12b of the output optical member 12 as a vivid optical image.

Also, since the CCD 101 is disposed in contact with the exit surface 12b of the output optical member 12, the imaging apparatus 100 can capture the optical image transmitted to the exit surface 12b of the output optical member 12.

Further, in the imaging unit 100, since the light-shielding material is disposed on the side faces of each optical member, light is prevented from entering each optical member from the side faces thereof, whereby the S/N ratio can be enhanced.

As a result, the imaging unit 100 can capture a clear, high-contrast, high-resolution, enlarged image.

Figure 12:
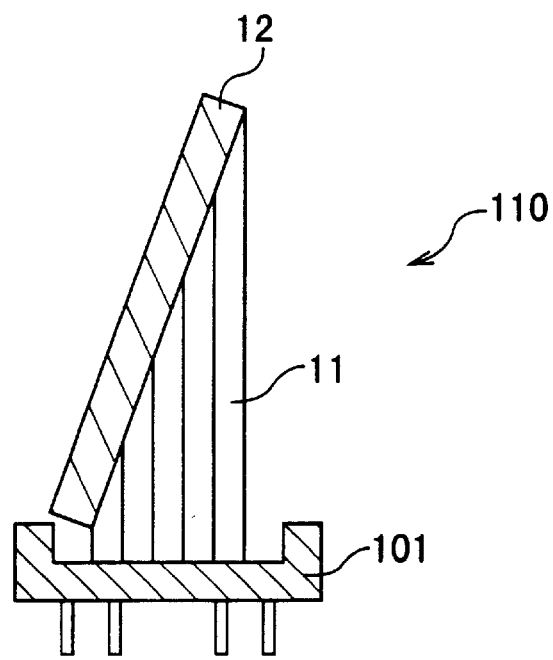
FIG. 12 is a configurational view of an imaging apparatus.

Also, the CCD 101 may be disposed in contact with the entrance surface 11a of the input optical member 11 constituting the optical device 10, so as to construct an imaging apparatus 110 as shown in FIG. 12.

Further, though the CCD 100 is disposed in contact with the optical device 10 in the above-mentioned imaging apparatus 100 or 110, the output image outputted from the optical device 10 may be made incident on the CCD 101 by way of a lens or the like.

INDUSTRIAL APPLICABILITY

As mentioned above, the optical device of the present invention can be used in imaging apparatus, for example.

What is claimed is:

1. An optical device comprising:

a first optical member, composed of a plurality of optical fibers arranged parallel to each other and integrally formed, having a first end face and a second end face which intersect an optical axis at respective angles of $\alpha_1, \beta_1$; and a second optical member, composed of a plurality of optical fibers arranged parallel to each other and integrally formed, having a third end face intersecting an optical axis at an angle of $\alpha_2$ and a fourth end face parallel to said third end face;

wherein said second end face and said third end face are in contact with each other;

wherein said $\beta_1$ is smaller than said $\alpha_2$; and wherein an angle $\theta_1$ formed between the optical axis of said first optical member and the optical axis of said second optical member is an angle of difference between $\beta_1$ and $\alpha_2$.

2. An optical device according to claim 1, wherein said $\alpha_1$ is 90°.

3. An optical device according to claim 1, wherein said $\alpha_2$ is an acute angle.

4. An imaging apparatus comprising:

the optical device according to claim 1; and an imaging device disposed on said fourth end face side.

5. An imaging apparatus comprising:

the optical device according to claim 1; and an imaging device disposed on said first end face side.

* * * * *